United States Patent
Buschmann

(10) Patent No.: US 9,719,216 B2
(45) Date of Patent: Aug. 1, 2017

(54) DETERMINATION OF THE SCREED CONFIGURATION IN ROAD PAVERS

(71) Applicant: JOSEPH VOEGELE AG, Ludwigshafen/Rhein (DE)

(72) Inventor: Martin Buschmann, Neustadt (DE)

(73) Assignee: JOSEPH VOEGELE AG (DE)

( * ) Notice: Subject to any disclaimer, the term of this patent is extended or adjusted under 35 U.S.C. 154(b) by 0 days.

(21) Appl. No.: 15/226,301

(22) Filed: Aug. 2, 2016

(65) Prior Publication Data
US 2017/0037585 A1 Feb. 9, 2017

(30) Foreign Application Priority Data

Aug. 4, 2015 (EP) ..................................... 15179644

(51) Int. Cl.
| | | |
|---|---|---|
| *E01C 19/00* | (2006.01) | |
| *E01C 19/42* | (2006.01) | |
| *E01C 19/48* | (2006.01) | |
| *B60W 40/13* | (2012.01) | |
| *E01C 19/22* | (2006.01) | |
| *E01C 19/26* | (2006.01) | |
| *E01C 23/01* | (2006.01) | |

(52) U.S. Cl.
CPC ............. *E01C 19/42* (2013.01); *B60W 40/13* (2013.01); *E01C 19/22* (2013.01); *E01C 19/266* (2013.01); *E01C 19/48* (2013.01); *E01C 23/01* (2013.01); *E01C 2301/16* (2013.01)

(58) Field of Classification Search
CPC .......... E01C 19/22; E01C 19/42; E01C 19/48; E01C 19/266; E01C 23/01; E01C 2301/16; B60W 40/13

USPC .................................................... 404/72, 118
See application file for complete search history.

(56) References Cited

U.S. PATENT DOCUMENTS

| 8,356,957 | B2 | 1/2013 | Weiser |
|---|---|---|---|
| 2009/0090237 | A1 | 4/2009 | Nishikawa et al. |
| 2010/0256878 | A1 | 10/2010 | Zegowitz |
| 2014/0186115 | A1 | 7/2014 | Graham et al. |

(Continued)

FOREIGN PATENT DOCUMENTS

| EP | 2239374 A1 | 10/2010 |
|---|---|---|
| EP | 2366830 A1 | 9/2011 |

(Continued)

OTHER PUBLICATIONS

Extended European Search Report Dated Jan. 5, 2016, Application No. 15179644.8, Applicant Joseph Vögele AG, 8 Pages.

(Continued)

*Primary Examiner* — Raymond W Addie
(74) *Attorney, Agent, or Firm* — Brooks Kushman P.C.

(57) ABSTRACT

A method for determining a configuration of a paving screed out of several possible configurations, whereby the paving screed is fastened on a machine frame of a tractor of a road paver. The method includes detecting a mass of the paving screed by a weighing system and determining the configuration of the paving screed on the basis of the detected mass of the paving screed. A road paver includes a tractor with a material hopper and a machine frame, wherein a paving screed is fastened on the machine frame. The road paver includes a weighing system that is configured to detect a mass of the paving screed.

14 Claims, 3 Drawing Sheets

(56) References Cited

U.S. PATENT DOCUMENTS

| | | |
|---|---|---|
| 2014/0294503 A1 | 10/2014 | Ramos et al. |
| 2014/0363230 A1 | 12/2014 | Buschmann et al. |
| 2016/0185164 A1* | 6/2016 | Thiesse ................. B60C 23/004 152/418 |

FOREIGN PATENT DOCUMENTS

| | | |
|---|---|---|
| EP | 2813619 A1 | 12/2014 |
| JP | H11245137 A | 9/1999 |
| JP | 2008032174 A | 2/2008 |
| JP | 2009085884 A | 4/2009 |
| JP | 2011204236 A | 10/2011 |
| JP | 2014240594 A | 12/2014 |

OTHER PUBLICATIONS

Japanese Office Action Dated May 23, 2017, Application No. 2016-152398, 4 Pages.

* cited by examiner

DETERMINATION OF THE SCREED CONFIGURATION IN ROAD PAVERS

CROSS-REFERENCE TO RELATED APPLICATIONS

This application claims foreign priority benefits under 35 U.S.C. §119(a)-(d) to European patent application number EP 15179644.8, filed Aug. 4, 2015, which is incorporated by reference in its entirety.

TECHNICAL FIELD

The disclosure relates to a method for determining a configuration of a paving screed of a road paver as well as to a road paver.

BACKGROUND

Road pavers are known from practical use. They often have a tractor that pulls a so-called paving screed for smoothing and compacting of road surfaces. Modern paving screeds can be adapted to the respective conditions at the construction site due to a wide range of configuration possibilities. Due to the increasing automation of the operation of road pavers, detection of the respective screed configuration by the machine control system is of great interest. At the beginning, the usual practice consisted of having the respective screed configuration manually entered by the operating personnel of the road paver. However, as this is cumbersome and time-consuming, methods to simplify this process have been developed to an increasing extent.

EP 2 239 374 A1 discloses a road paver with a read-out device that can read out identification devices that are to be installed on additional components of the road paver. For example, parts of paving screeds are referred to as additional components. A screed system is known from US 2014/0294503 in which components of the screed are equipped with identification modules that can exchange data pertaining to the respective screed part with each other in case of coupling and finally transfer such data to a control unit.

Both systems require an identification device to be provided on each installed part. Due to this, either the acquisition of new parts with identification devices or the retrofit of identification devices becomes necessary. In addition, the data exchange can be prone to error, particularly in complex screed configurations with a very large number of parts. A solution for recording of the screed width is known from the EP 2 813 619 A1 of the applicant. There, the paving width of the paving screed between so-called lateral sliders should be measured directly. However, only the screed width can be recorded in this way. Other properties of the screed configuration cannot be recorded in this manner.

SUMMARY

A purpose of the disclosure is to provide an improved determination of a screed configuration.

The disclosure provides a method for determining a configuration of a paving screed out of several possible configurations. The paving screed is thereby fastened on a machine frame of a tractor of a road paver. The method according to the disclosure is characterized by detecting a mass of the paving screed by a weighing system and determining the configuration of the paving screed on the basis of the detected mass of the paving screed. The weighing system can thereby comprise, inter alia, a sensor and an evaluation unit. Different types of sensors that measure or record parameters, which allow direct or indirect conclusions as to the mass of the paving screed, may be provided as the sensor. Examples for sensors are explained further below.

A screed configuration and/or a configuration is to be understood as a combination of different screed components and/or features. Hence, in the course of determining the configuration, the components the screed consists of should for example be established, e.g., widening pieces, main screed type or also lateral sliders, as well as the features it comprises, e.g., installation width, inclination or a measure for the possible compaction for example based on the detection of installed compaction elements such as vibration elements, tampers or pressure bars.

The evaluation unit can for example be an electronic control device that uses the value measured by the sensor for determining the mass of the paving screed. Based on the detected mass, the configuration of the paving screed can then be determined out of several possible configurations. This can be performed for example by the evaluation unit of the weighing system. However, it is also conceivable that the evaluation unit of the weighing system submits the calculated mass to other suitable components of the road paver so that they can determine the configuration of the paving screed. In addition, it is possible that the weighing system comprises only the sensors. In this case, the weighing system can be provided without an evaluation unit. In this respect, it is possible that the evaluation of the sensor data can be performed by an electronic control device of another system of the road paver. The weighing system can be installed on the road paver. However, it is equally possible for the weighing system to be provided separately from the road paver, for example as a separate additional system.

It is conceivable that the calculated mass of the paving screed is compared to known masses that are assigned to known screed configurations. This can serve as a way to determine the configuration of the paving screed. A table may for example be provided by the factory or another mode of assignment can be predefined, which assigns a corresponding mass value of a paving screed configured in this way to known screed configurations. The detected mass can then be compared to the mass values so that a screed configuration can be assigned to the calculated mass. Also, mass ranges can be predefined as known masses so that the detected masses that fall into this range can be assigned to the respective corresponding screed configuration. This way, the configuration of the paving screed can also be determined in case of deviations such as measurement inaccuracies or inaccuracies during calculation of the mass.

Calculation of the known mass and/or the mass values can occur in different ways. On one hand, it is conceivable that the nominal masses of different screed components and add-on parts are added in different possible combinations so as to obtain a nominal weight of a configuration of the paving screed that consists of such a combination of components and/or add-on parts. On the other hand, it is conceivable that different possible combinations are actually built, i.e., that different combinations of screed components and/or add-on parts are mounted and that their mass is determined empirically. Both empirically determined masses as well as calculated masses can be complemented by a tolerance range in order to obtain the mass ranges that have already been mentioned above.

In a further variant, the calculated mass of the paving screed can be compared to reference masses that are determined, e.g., calculated, out of known masses of known screed components. This method can be similar to the calculation by means of nominal masses. For example, a table or another assignment form can be predefined by the factory, which assigns different screed components and/or add-on parts and their respective mass to each other. Then, the mass of the paving screed detected by the weighing system can be compared to different combinations of the nominal masses and the most likely configuration of the paving screed can be determined by way of a suitable selection method. For the case that one and the same mass can be assigned to different combinations of screed components and/or add-on parts, it can be provided to leave the final selection of the actual configuration at the discretion of a user of the road paver. For example, the possible configurations can be displayed to the user so that he can choose the most plausible configuration.

As already mentioned above, different parameters that allow for conclusions regarding the mass of the paving screed are conceivable. For example, the mass of the paving screed can be calculated based on a pressure in a hydraulic device that is attached to the paving screed on one side and to the road paver on the other side. Such device can for example be a hydraulic cylinder and in particular a so-called screed lifting and/or relief cylinder. The hydraulic device can for example be connected to a part of the machine frame of the road paver on one side and to the paving screed on the other side. It is conceivable that said connection with the paving screed is implemented directly, e.g., on structural components of the paving screed. However, it is equally conceivable that the connection with the paving screed is set up indirectly, for example through a connection of the hydraulic device with a structure that supports or where required flexibly supports the screed on the road paver. In this context, pulling arms are particularly conceivable, which are often used in tractors of road pavers to pull the paving screed.

The disclosure also relates to a road paver that comprises a tractor with a material hopper and a machine frame, wherein a paving screed is fastened on the machine frame. Such a road paver according to the disclosure is characterized by a weighing system that is configured to detect a mass of the paving screed. As already mentioned, the weighing system can comprise an evaluation unit and different types of sensors. Both can be configured according to the above descriptions. Consequently, the road paver can comprise further control devices where required, which control different functions of the road paver and which can handle the determination of the configuration of the paving screed. However, it is also conceivable that a separate control device that performs exclusively this function is provided for determining the configuration of the paving screed.

It can be an advantage if the weighing device is configured to determine a configuration of the paving screed based on the detected mass of the paving screed. This can be done by the evaluation unit or by a control device that is provided separately. As already mentioned above, it is though equally conceivable that a control device that is used in other functions of the road paver is used to determine the configuration of the paving screed.

It is conceivable that the weighing system is configured to compare the calculated mass of the paving screed with known masses that are assigned to known screed configurations. To avoid repetitions in this respect, reference is made to the above explanations.

In a further variant, the weighing system can be configured to compare the detected mass of the paving screed with reference masses that are computed out of known masses of known screed components. Also in relation to this variant, reference is made to the above explanations.

The weighing system can advantageously be provided on the road paver. Alternatively, however, a separately designed weighing system is also conceivable. The advantages of a variant on the road paver include for example the continuous availability and the use of components such as sensors that are already existing on the road paver. A separate variant can also be used as a retrofit solution for conventional road pavers. A weighing system can thereby be used for example for several road pavers at the same construction site.

It can be advantageous if the weighing system comprises a pressure sensor that is to be provided in a hydraulic device that is attached on the paving screed on one side and on the tractor on the other side in order to determine the pressure in the hydraulic device. The attachment of the hydraulic device shall thereby also be understood in the same way as already mentioned before.

It is conceivable that the mass of the paving screed is determined on the basis of the identified pressure in the hydraulic device.

In a further variant, the weighing system comprises a force measuring bolt. This force measuring bolt can be provided e.g., at the junction between a hydraulic device and the tractor or the connection between the paving screed and the hydraulic device. This is also a simple and possibly retrofittable solution for a sensor of the weighing system. The force measuring bolt can for example be installed at a fastening point between the machine frame and the hydraulic device or at a fastening point between the hydraulic device and the paving screed.

In a further variant, the weighing system has a strain measuring strip.

The disclosure relates to a method as well as a road paver of the above-described type. An embodiment will be explained in greater detail below with reference to the attached drawings.

DETAILED DESCRIPTION

As required, detailed embodiments are disclosed herein; however, it is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
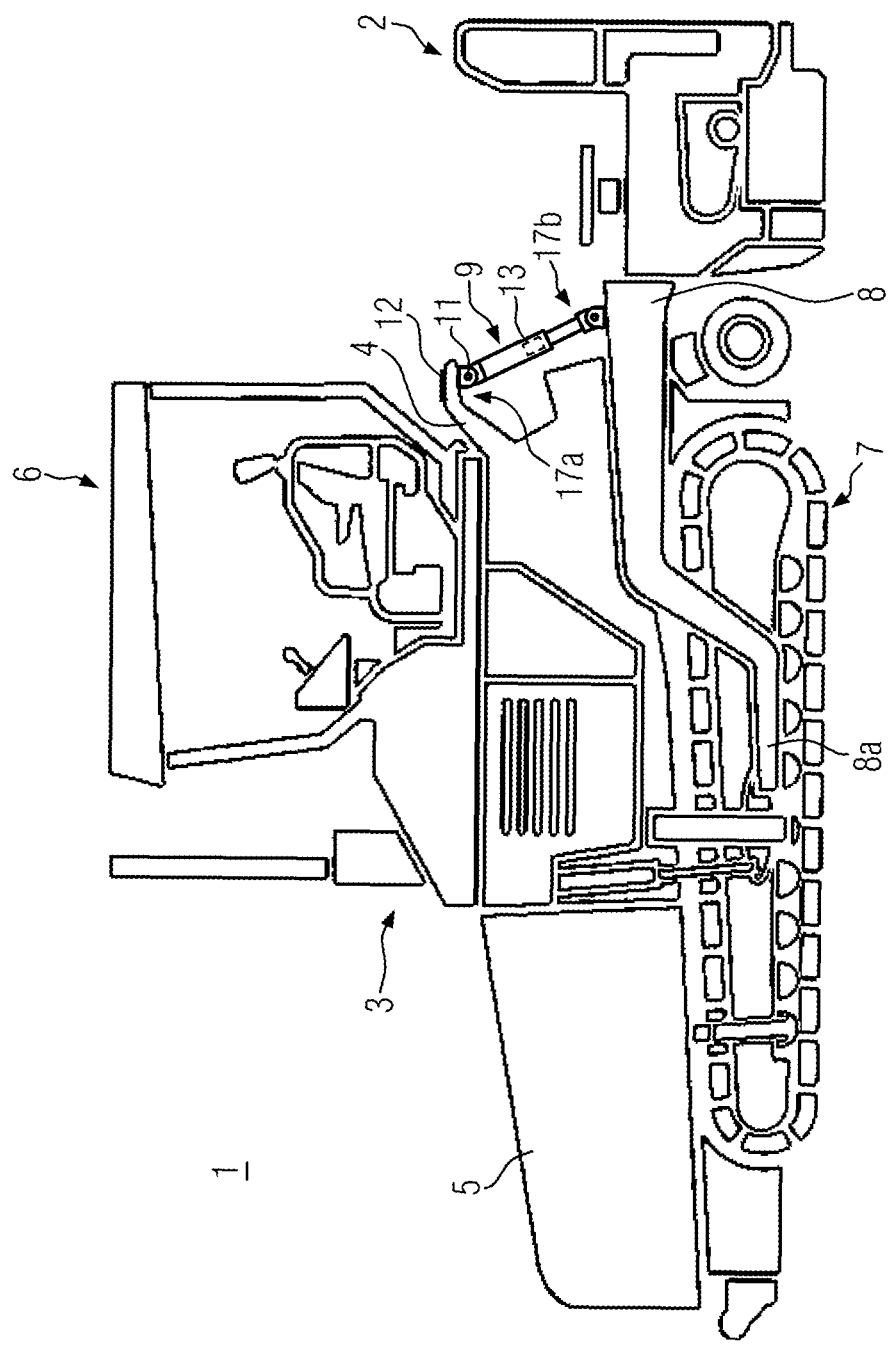
FIG. 1 shows a road paver according to the disclosure that is suitable for the implementation of the method according to the disclosure.

FIG. 1 shows a road paver 1 according to an embodiment of the disclosure. It comprises a paving screed 2 that is pulled by a tractor 3. The tractor comprises a machine frame 4. Components of the road paver 1 may be fastened directly or indirectly on this machine frame. The tractor 3 comprises for example a material hopper 5, a driver or operator stand 6 and a chassis 7. The latter is a tracklaying chassis in the embodiment. However, a chassis with individual wheels is also conceivable. The paving screed 2 is mounted to the machine frame 4 through a pulling arm 8. As usual in modern road pavers, the pulling arm 8 is pivotably supported at its fastening point 8a on the machine frame 4. This allows to pull the screed 2 in a floating way on the layed asphalt.

There is a further mechanical connection between the machine frame 4 and the paving screed 2 besides the pulling arms 8. In the present embodiment, this connection comprises a hydraulic device 9, which can be a hydraulic cylinder 9. In the present embodiment, the mechanical connection is designed in a way as to be installed between the machine frame 4 and the pulling arm 8. However, it is equally conceivable that the connection is provided directly between the machine frame 4 and the paving screed 2. According to the embodiments, the hydraulic cylinder 9 is fastened with its piston side on the machine frame 4 and with its piston rod side on the pulling arm 8. An inverse configuration is equally conceivable though. Also, it is possible that the hydraulic device and/or the hydraulic cylinder 9 is connected to the machine frame 4 on one side and directly to the paving screed 2 on the other side.

Figure 2:
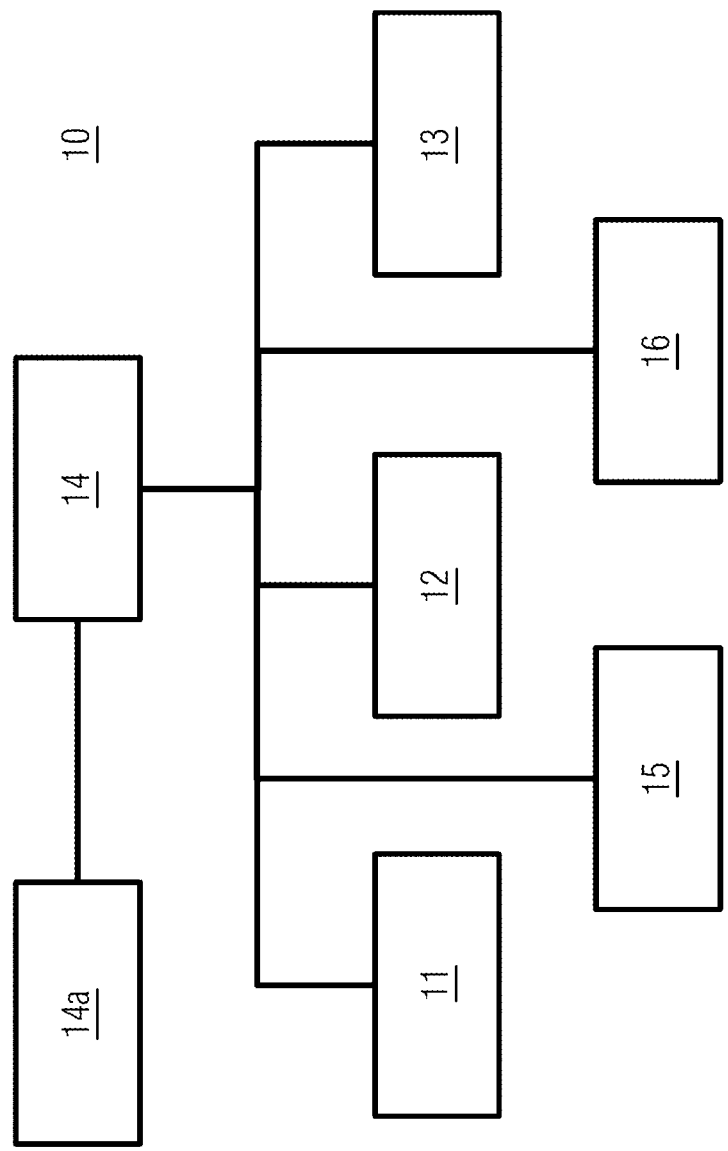
FIG. 2 schematically shows components of a weighing system for a road paver according to the disclosure.

FIG. 2 illustrates possible components of a weighing system 10 that is to be installed in the road paver 1. The weighing system 10 is configured to detect the mass of the paving screed 2. For this purpose, the weighing system 10 in the illustrated embodiment comprises a force measuring bolt 11, a strain measuring strip 12 as well as a pressure sensor 13 that will be explained in greater detail in the following. In the illustrated embodiment, the force measuring bolt 11 is provided on a first fastening point 17 a between the hydraulic cylinder 9 and the machine frame 4. However, it can also be provided on a second fastening point 17 b between the hydraulic cylinder 9 and the pulling arm 8 and/or the paving screed 2.

In the present embodiment, the strain measuring strip 12 is to be installed on the machine frame 4. It is thereby arranged close to the first fastening point 17 a between the hydraulic device 9 and the machine frame 4. However, it is also conceivable to arrange the strain measuring strip 12 at a random point along the flow of force between the machine frame 4 and the paving screed 2.

The pressure sensor 13 is to be installed on the inside of the hydraulic device 9. In the present embodiment, it is located in the hydraulic chamber of the piston rod side of the hydraulic cylinder 9. There, it records the hydraulic pressure that exists in that place. Alternatively, the pressure sensor 13 can also be provided in the hydraulic chamber of the piston side of the hydraulic cylinder 9.

All sensors 11, 12, 13 are used to determine the force that is taken up by the mechanical connection between the machine frame 4 and the paving screed 2. For this purpose, measurement signals are transmitted to a control device 14. In the present embodiment, this control device 14 is a component of the weighing system 10. However, it is also conceivable that the measurement signals are transmitted to a control device 14 that is provided on the road paver 1 for the control of other functions. The control device 14 can be an electronic control device. The measurement signals can be raw sensor values. However, it is equally conceivable that first processing steps are already performed on the sensors 11, 12, 13 so that for example values that indicate the forces that act between the machine frame 4 and the paving screed 2 are transmitted to the control device 14. This can occur in a digital and/or analog form.

The weighing system 10 according to the embodiment further comprises an acceleration sensor 15 and an inclination sensor 16. These sensors also transmit measurement signals to the control device 14. Thereby, the weighing system 10 and/or the control device 14 can derive an inclination of the road paver 1 in relation to the plumb line. In combination with the measurement signals of the sensors 11, 12 and 13, the mass of the paving screed 2 can be calculated in this way.

Although the force measuring bolt 11, the strain measuring strip 12 as well as the pressure sensor 13 are provided in the present embodiment to determine the force acting between the machine frame 4 and the paving screed 2, in other embodiments of the disclosure, the weighing system can comprise only one or two of the mentioned sensors. Likewise, any other sensor to determine the forces taken up by the mechanical connection between the machine frame 4 and the paving screed 2 is conceivable. Also the acceleration sensor 15 and the inclination sensor 16 are indicated here as mere examples for one or several random sensors that are suitable to determine the inclination of the road paver 1 in relation to the plumb line. It should be clear that, according to the disclosure, just an acceleration sensor 15 or just an inclination sensor 16 can be provided.

The mechanical connection between the machine frame 4 and the paving screed 2 can be installed in several places. In case of road pavers, for example, it is a common practice to provide two hydraulic cylinders 9. However, also any other number is conceivable. In such cases, the forces that are taken up by the mechanical connection can be recorded at all locations. Based on the forces recorded this way, for example the weight distribution of the paving screed 2 can be determined. It is also conceivable that conclusions can be drawn regarding the inclination of the paving screed 2 in relation to the tractor 3 on the basis of this weight distribution.

On the basis of the determined force that is taken up by the mechanical connection as well as on the basis of further known parameters such as the determined inclination of the road paver as well as the weight of the pulling arm 8, the length of the pulling arm 8 and/or of the suspension point of the pulling arm 8, the mass of the paving screed 2 can be calculated.

Figure 3:
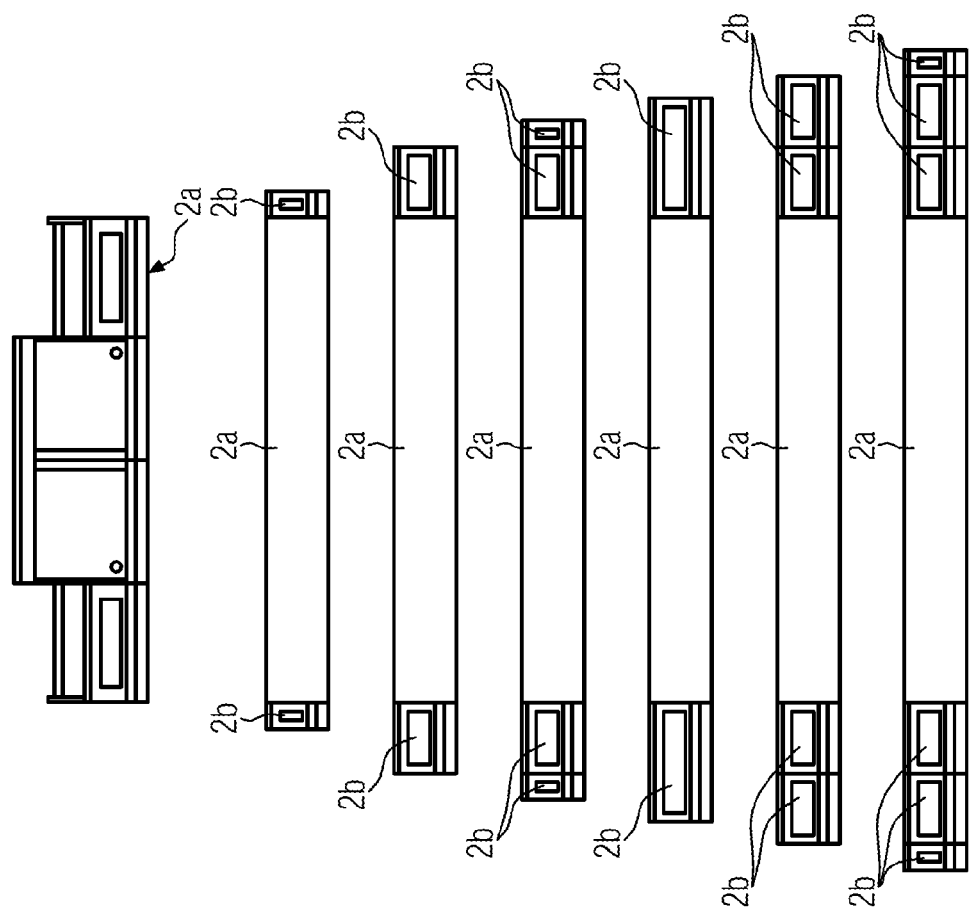
FIG. 3 schematically shows different screed configurations.

The mass of the paving screed 2 is then used as a basis for determining the configuration of the paving screed 2. FIG. 3 schematically displays seven different screed configurations in an exemplary way. They contain different, sometimes multiple screed components 2a, 2b. In FIG. 3, an extending screed 2a is provided as a main component 2a in an exemplary way. It is installed on the tractor 3. Multiple different additional components 2b can be installed on the main component 2a, e.g., rigid elongation parts with a respective fixed length. This can be used for example to extend the paving width of the paving screed 2 as shown in FIG. 3.

However, it should be clear that any number of different configurations is conceivable for the paving screed 2 in practice. Table 1 indicates an exemplary assignment of different mass values to corresponding paving widths as may for example be provided for the screed configurations illustrated in FIG. 3.

If the above-mentioned detection of the screed mass results for example in a mass of 5500 kg, it can be concluded that the width of the screed is 7.5 m. However, it is conceivable that further configuration features can be determined besides or as an alternative to the paving screed width. Hence, it is conceivable that the equipment of the screed 2 with vibration devices, i.e., so-called tampers or pressure bars, can be determined. For this purpose, however, a very precise mass detection and/or an elaborate assigning process might be required.

TABLE 1

| Paving width [m] | Mass[kg] |
|---|---|
| 5.0 | 3,500 |
| 5.5 | 4,000 |
| 6.5 | 4,500 |
| 7.0 | 5,000 |
| 7.5 | 5,500 |
| 8.0 | 6,000 |
| 8.5 | 6,500 |

An assignment of measurement values to corresponding screed configurations as indicated in an exemplary way in Table 1 can be stored preferably on an electronic storage medium 14a. This medium can be installed in a fixed way in the road paver 1 or designed so as to be removable for a user.

In any case, it is conceivable for the allocation to be modifiable by the user so that the selection of the screed configurations may be reduced where required, e.g., to those configurations that are actually used by the user. It is conceivable that also the mass values and/or mass ranges can be changed. In this way, for example the mass ranges can be extended and the number of possible screed configurations can be reduced. This may increase the detection accuracy and/or speed. In addition, it is conceivable that the assignment is provided by the factory. An assignment adapted to the customer requirements can be provided, or one that comprises all possible screed configurations and corresponding mass values and/or mass ranges.

In a second assignment variant as described at the beginning, in which the detected mass is compared to reference masses that are for example calculated by the weighing system 10 based on known masses of known screed components 2a, 2b, an assignment of configuration features of the screed components 2a, 2b to corresponding known mass values can be provided. As already mentioned, a plurality of included configuration features is conceivable, e.g., the equipment of the screed components 2a, 2b with vibration devices, i.e., so-called tampers or pressure bars, or the paving width. The assignment can also be stored on an electronic storage medium 14a that is also installed firmly in the road paver 1 or that can be designed so as to be removable by the user.

Also the second assignment variant can be designed in a way as to be modifiable by the user. In this case, it is conceivable in addition to the modification possibilities described above in connection with the first allocation variant that the selection of screed components 2a, 2b based on which the reference masses are calculated is reduced or extended, for example to the screed components 2a, 2b that are actually available for the user.

As one skilled in the art would understand, the weighing system 10 (e.g., one or more associated components, such as sensors 11, 12, 13, 15 and 16, control device 14, etc.) and/or control device on the road paver 1 may include suitable hardware and/or software, such as one or more processors (e.g., one or more microprocessors, microcontrollers and/or programmable digital signal processors) in communication with, or configured to communicate with, one or more storage devices or media including computer readable program instructions that are executable by the one or more processors so that the weighing system 10 and/or control device of the road paver 1 may perform particular algorithms represented by the functions and/or operations described herein. The weighing system 10 and/or control device of the road paver 1 may also, or instead, include one or more application specific integrated circuits, programmable gate arrays or programmable array logic, programmable logic devices, or digital signal processors.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A method for determining a configuration of a paving screed out of several possible configurations, wherein the paving screed is fastened on a machine frame of a tractor of a road paver, the method comprising:
    detecting a mass of the paving screed by a weighing system and determining the configuration of the paving screed based on the detected mass of the paving screed.

2. The method according the claim 1 wherein the detected mass of the paving screed is compared to known masses that are assigned to known screed configurations.

3. The method according to claim 1 wherein the mass of the paving screed is detected on the basis of a pressure in a hydraulic device that is fastened on the paving screed on one side and on the tractor on the other side.

4. The method according to claim 1 wherein the detected mass of the paving screed is compared to reference masses that are computed out of known masses of known screed components.

5. A road paver comprising:
    a tractor including a material hopper and a machine frame;
    a paving screed that is fastenable on the machine frame; and
    a weighing system that is configured to detect a mass of the paving screed.

6. The road paver according to claim 5 wherein the weighing system is configured to determine a configuration of the paving screed based on the detected mass of the paving screed.

7. The road paver according to claim 5 wherein the weighing system is configured to compare the detected mass of the paving screed to known masses that are assigned to known screed configurations.

8. The road paver according to claim 5 wherein the weighing system is configured to compare the detected mass of the paving screed to reference masses that are computed out of known masses of known screed components.

9. The road paver according to claim 5 wherein the weighing system is installable at least partially on the machine frame.

10. The road paver according to claim 5 further comprising a hydraulic device configured to be connected to the paving screed and the tractor, wherein the weighing system comprises a pressure sensor that is installable on the hydraulic device in order to determine pressure that exists in the hydraulic device.

11. The road paver according to claim 10 wherein the mass of the paving screed is determined on the basis of the determined pressure in the hydraulic device.

12. The road paver according to claim 5 wherein the weighing system comprises a force measuring bolt.

13. The road paver according to claim 12 further comprising a hydraulic device configured to be connected to the paving screed and the tractor, wherein the force measuring bolt is installable on a fastening point between the machine frame and the hydraulic device or on a fastening point between the hydraulic device and the paving screed.

14. The road paver according to claim 5 wherein the weighing system comprises a strain measuring strip.

* * * * *